United States Patent
Pucher

(10) Patent No.: US 8,887,748 B2
(45) Date of Patent: Nov. 18, 2014

(54) PRESSURE REDUCER

(75) Inventor: Peter Pucher, Judendorf Strassengel (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 155 days.

(21) Appl. No.: 13/469,018

(22) Filed: May 10, 2012

(65) Prior Publication Data
US 2012/0285547 A1 Nov. 15, 2012

(30) Foreign Application Priority Data
May 11, 2011 (DE) .......................... 10 2011 101 187

(51) Int. Cl.
F17D 1/00 (2006.01)

(52) U.S. Cl.
USPC ...... 137/12; 137/487.5; 137/489; 137/599.01

(58) Field of Classification Search
CPC ... G05D 16/10; G05D 16/103; G05D 16/106; G05D 16/0608; F16K 31/42
USPC ............... 137/12, 497, 488, 489, 489.5, 495, 137/624.27, 599.01, 861, 505.13, 505.15; 251/30.01, 30.02
See application file for complete search history.

(56) References Cited

U.S. PATENT DOCUMENTS

| | | | | |
|---|---|---|---|---|
| 1,956,977 A * | 5/1934 | Shawn | ......................... | 137/497 |
| 4,669,493 A * | 6/1987 | Kober et al. | ..................... | 137/73 |
| 4,673,162 A * | 6/1987 | Lachmann | ................. | 251/30.01 |
| 4,714,005 A * | 12/1987 | Leemhuis | ........................ | 91/361 |
| 5,156,080 A * | 10/1992 | Pelto-Huikko | ................ | 91/461 |
| 5,722,454 A * | 3/1998 | Smith et al. | ................... | 137/503 |
| 6,170,508 B1 * | 1/2001 | Faust et al. | ..................... | 137/12 |
| 7,318,447 B2 * | 1/2008 | Law | ........................... | 137/487.5 |
| 7,343,845 B2 * | 3/2008 | Wirtl et al. | .................. | 91/358 R |
| 2004/0075070 A1 * | 4/2004 | Munsterhuis | .............. | 251/30.02 |

(Continued)

FOREIGN PATENT DOCUMENTS

| | | | |
|---|---|---|---|
| DE | 1523323 A * | 3/1969 | |
| DE | 4244292 A1 * | 6/1994 | |
| DE | 29602064 U1 * | 3/1997 | |
| DE | 4442085 C2 * | 7/1999 | |

(Continued)

OTHER PUBLICATIONS

Machine Translation of DE102008011982A1 from EPO website (worldwide.espacenet.com) on Dec. 31, 2013.*

Primary Examiner — Craig Schneider
Assistant Examiner — Jessica Cahill
(74) Attorney, Agent, or Firm — Jordan IP Law, LLC; Todd A. Vaughn

(57) ABSTRACT

A pressure reducer having a high-pressure inlet, a low-pressure outlet and a valve having a valve seat and a valve plunger, which interacts therewith and can be displaced in a direction of displacement. When displaced away from the valve seat, the valve plunger opens a first path between the high-pressure inlet and the low-pressure outlet. The pressure reducer furthermore includes a second path, which connects the high-pressure inlet and the low-pressure outlet, a first control valve, which is arranged in the course of the second path, and a first effective area of the valve plunger, which is arranged in the course of the second path and is aligned in such a way that a first control pressure acting thereon results in a first force on the valve plunger in the direction of displacement.

18 Claims, 5 Drawing Sheets

(56) References Cited

U.S. PATENT DOCUMENTS

| | | | |
|---|---|---|---|
| 2008/0023661 A1* | 1/2008 | Gu et al. | 251/30.01 |
| 2008/0047611 A1* | 2/2008 | Stemer | 137/171 |
| 2008/0251146 A1* | 10/2008 | Folk | 137/624.27 |
| 2010/0071787 A1* | 3/2010 | Folk et al. | 137/489 |
| 2010/0243068 A1* | 9/2010 | Fisher | 137/14 |
| 2010/0276615 A1* | 11/2010 | Borst et al. | 251/30.01 |
| 2010/0326533 A1* | 12/2010 | Mooney et al. | 137/12 |

FOREIGN PATENT DOCUMENTS

| | | |
|---|---|---|
| DE | 102008011982 A1 | 9/2009 |
| DE | 102008011982 A1 * | 9/2009 |
| EP | 1758007 A1 * | 2/2007 |
| JP | 54-63430 * | 5/1979 |
| JP | 54063430 A * | 5/1979 |
| JP | 2002-71048 A * | 3/2002 |
| JP | 2002071048 A * | 3/2002 |

* cited by examiner

US 8,887,748 B2

PRESSURE REDUCER

CROSS-REFERENCE TO RELATED APPLICATIONS

The present application claims priority under 35 U.S.C. §119 German Patent Application No. DE 10 2011 101 187.4 (filed on May 11, 2011), which is hereby incorporated by reference in its entirety.

FIELD OF THE INVENTION

The invention relates to a method for operating a pressure reducer, and a pressure reducer having a high-pressure inlet, a low-pressure outlet and a valve with a valve seat and a valve plunger which interacts therewith and can be displaced in a direction of displacement. When displaced away from the valve seat, the valve plunger opens a first path between the high-pressure inlet and the low-pressure outlet.

BACKGROUND OF THE INVENTION

Pressure reducers are used very generally to reduce the pressure of a fluid (liquid or gaseous). Normally, they are installed in a pipe conduit, with the result that a relatively high pressure prevails at the high-pressure inlet but a relatively low pressure prevails at the low-pressure outlet. For example, the pressure in a water conduit or the pressure from a compressed air or gas cylinder can be reduced to a desired level by means of a pressure reducer or pressure regulator of the type stated at the outset.

For this purpose, DE 1 523 323 A1, for example, discloses a two-stage pilot arrangement for a high-pressure gas regulator, in particular for high inlet pressures and high pressure drops. This regulator has a main valve with a spring-loaded valve plunger for adjusting the pressure drop between a high-pressure inlet and a low-pressure outlet and a device for producing a pilot loading pressure.

DE 10 204 746 A1 relates to a gas pressure regulator for regulating a gas pressure, especially in a gas-powered vehicle, and includes a housing with an inlet and outlet and a low-pressure chamber arranged in the flow path between the inlet and outlet. A valve arrangement having a closing element can open or close a sealing seat for regulating the gas pressure to a greater or lesser extent. Arranged in the low-pressure chamber is a diaphragm, which is subjected to the pressure from the low-pressure chamber. A first device is used to preload the diaphragm. Moreover, at least one further device is provided for the purpose of changing the preload on the diaphragm. For actuation of the closing element, the closing element is connected to the diaphragm or to the further device.

The disadvantage with the known pressure reducers is that they are technically relatively complex, and therefore expensive. Moreover, one major problem of current pressure reducers or pressure regulators is that they cannot be operated in a particularly large inlet pressure range if the outlet pressure is to be held constant, without any significant fluctuations, irrespective of environmental factors and of the inlet pressure. This is because, if the pressure at the inlet is also high, high forces occur at seals owing to friction, and the force required to ensure adequate seal seating is high, making precise regulation of the outlet pressure more difficult. If the inlet pressure falls and if it approaches the outlet pressure to be set, on the other hand, said forces decrease. Moreover, regulation of the outlet pressure is affected by other factors, such as the flow rate, changes in temperature etc. In addition, the regulated outlet pressure is often subject to hysteresis.

SUMMARY OF THE INVENTION

It is then an object of the invention to provide an enhanced pressure reducer and an enhanced method for operating a pressure reducer. In particular, the pressure reducer in accordance with embodiments of relatively simple technical construction, in which only slight adjusting forces are needed to adjust the pressure reducer.

In accordance with embodiments, a pressure reducer includes at least one of the following: a high-pressure inlet, a low-pressure outlet, and a valve with a valve seat and a valve plunger which interacts therewith and can be displaced in a direction of displacement; a first path between the high-pressure inlet and the low-pressure outlet and opened when the valve plunger is displaced away from the valve seat; a second path which connects the high-pressure inlet and the low-pressure outlet, a first controllable valve which is arranged in the course of the second path, and a first effective area of the valve plunger which is arranged in the course of the second path and is aligned in such a way that a first control pressure acting thereon results in a first force on the valve plunger in the direction of displacement.

In accordance with embodiments, a method for operating the aforementioned pressure reducer includes at least one of the following: adjusting via the first controllable valve, a first control pressure which acts on the first effective area of the valve plunger and results in a first force thereon in the direction of displacement, wherein the first effective area and the first controllable valve are arranged in the course of a second path connecting the high-pressure inlet and the low-pressure outlet.

In accordance with embodiments, the pressure difference between the high-pressure inlet and the low-pressure outlet can be continuously adjusted via, a small flow via the second path. The "control flow," i.e., the flow via the second path, is small in relation to the possible flow via the first path. An opening cross section of a control valve in the course of the second path and hence the actuating force thereof for opening are thus likewise small. A servo or intensification effect is obtained here, and hence, relatively low adjusting forces at the control valve are sufficient in order to set the desired pressure difference between the high-pressure inlet and the low-pressure outlet. Moreover, in contrast to conventional pressure reducers, the use of the inlet pressure for opening the valve is such that higher forces are also available for valve opening at a high inlet pressure than at a low inlet pressure, and this likewise has a positive effect on the characteristics of the pressure reducer in accordance with embodiments of the invention.

Advantageous embodiments and developments of the invention will become apparent from the dependent claims and from the description when considered in conjunction with the figures.

In accordance with embodiments, it is advantageous if a restriction is provided in the course of the second path, and the first effective area is arranged between the restriction and the first controllable valve. In this way, it is possible to expand the adjustment range for the first control pressure, thus possibly making it easier to carry out regulation thereof.

In accordance with embodiments, it is particularly advantageous if a second controllable valve is provided in the course of the second path, and the first effective area is arranged between the first controllable valve and the second controllable valve. In this way, the adjustment range for the first control pressure can be expanded even further, making regulation thereof even easier.

In accordance with embodiments, it is furthermore particularly advantageous if a second effective area of the valve plunger is arranged in the course of the second path, the effective area being aligned in such a way that a second control pressure acting thereon results in a second force on the valve plunger in the direction of displacement, the second force acting counter to the first force. In this way, the pressure difference between the high-pressure inlet and the low-pressure outlet can be adjusted by way of the differential pressure between the first and the second control pressure. Good open-loop control or closed-loop control of the pressure difference between the high-pressure inlet and the low-pressure outlet is thereby achieved.

Moreover, the pressure reducer can be configured in such a way that no seal with respect to the environment of the housing is required for the valve plunger. The pressure reducer can therefore be of technically simple construction.

In accordance with embodiments, it is advantageous if the first controllable valve, the second controllable valve or the restriction is arranged in the course of the second path between the first effective area and the second effective area. In this way, a comparatively high differential pressure between the first and the second effective area can be achieved.

In accordance with embodiments, it is furthermore advantageous if the pressure reducer comprises a biasing mechanism such as a spring, which is provided for the purpose of exerting a spring force acting on the valve plunger in the direction of the first or the second force. This ensures that the force with which the valve plunger is pressed against the valve seat does not depend only on the pressure conditions in the pressure reducer. Thus, there is another way of exerting an influence available for achieving the desired force ratios at the valve plunger.

In accordance with embodiments, it is advantageous in this context if the second controllable valve is arranged in the course of the second path between the first effective area and the second effective area, and if the second force and the spring force are directed in a closing direction of the valve plunger. This ensures that a closing force continues to act on the valve plunger even when the second control valve is closed.

In accordance with embodiments, it is advantageous if the pressure reducer has a first measuring device and/or a second measuring device, which is/are set up to measure the first control pressure or the second control pressure. In this way, the actual pressure ratios at the valve plunger can be determined and, for example, made available to an open-loop controller or a closed-loop controller.

In accordance with embodiments, it is advantageous if the pressure reducer comprises an open-loop controller or has connected to it an open-loop controller, which is set up to control the first control valve and/or the second control valve. This makes it possible to specify the differential pressure between the high-pressure inlet and the low-pressure outlet by way of electronic or optical signals, for example. Using an electronic controller, it is furthermore possible to compensate for the effects of inlet pressure, flow rate, temperature etc. and to achieve a further enhancement in the regulation of the outlet pressure.

In accordance with embodiments, it is advantageous if the pressure reducer comprises a closed-loop controller or has connected to it a closed-loop controller, which is set up to detect the first control pressure and/or the second control pressure and to control the first control valve and/or the second control valve. This ensures that a specified differential pressure between the high-pressure inlet and the low-pressure outlet is in fact maintained.

In accordance with embodiments, it is advantageous if the first control valve and/or the second control valve is/are designed as a proportional valve. In this way, the differential pressure between the high-pressure inlet and the low-pressure outlet can be continuously adjusted.

In accordance with embodiments, it is also advantageous if the first control valve and/or the second control valve is/are designed as an on-off valve. In this way, it is possible to use control valves of very simple construction.

In accordance with embodiments, it is particularly advantageous in this context if the first control valve and/or the second control valve is/are controlled by means of a pulse-width-modulated signal. This makes it possible for the differential pressure between the high-pressure inlet and the low-pressure outlet to be continuously adjusted, even if the control valves are only on-off valves.

In accordance with embodiments, it is also advantageous if the first control valve/the second control valve is designed in such a way that a medium for which the pressure reducer is set up flows through the first control valve and/or the second control valve, even in the closed position, when a pressure difference is applied between the high-pressure inlet and the low-pressure outlet. Since the control or control valves is/are arranged along the second path which connects the high-pressure inlet to the low-pressure outlet, a flow through the control valves, even when they are closed, is not necessarily disruptive. In this variant of the invention, it is thus possible to use technically simple and inexpensive control valves.

In accordance with embodiments, it is advantageous if the first control valve and the second control valve are formed by a 3/3-way valve or a 3/2-way valve. This allows a particularly compact construction of the pressure reducer in accordance with embodiments of the invention. Moreover, the small number of components means that the assembly thereof is simpler.

In accordance with embodiments, it is also advantageous if a first and/or second control spool is/are provided instead of the first control valve/the second control valve. Control spools generally have a very fast response, thereby making it possible to achieve very rapid regulation of the differential pressure between the high-pressure inlet and the low-pressure outlet.

In accordance with embodiments, it is furthermore advantageous if a second control pressure, which acts on a second effective area of the valve plunger and results in a second force thereon, directed counter to the first force, in the direction of displacement, is adjusted by means of the first controllable valve, wherein the second effective area is arranged in the course of the second path. In this way, the differential control pressure at the valve plunger can be adjusted with just one control valve, thereby making it very simple to construct a control system.

In accordance with embodiments, it is also advantageous if the first control pressure, which acts on the first effective area of the valve plunger, and/or the second control pressure, which acts on the second effective area of the valve plunger, is/are adjusted by the first control valve and a second control valve, which are arranged in the course of the second path. This provides a further influencing parameter, namely the position of a second control valve, for adjusting the control pressure or the control pressures, and, as a result, the pressure reducer can be adjusted in a particularly flexible manner.

At this point, it is pointed out that the variants presented in connection with the pressure reducer according to the invention and the resulting advantages apply equally to the method in accordance with embodiments of the invention and vice versa.

The above embodiments and developments of the invention can be combined in any desired manner.

BRIEF DESCRIPTION OF THE DRAWINGS

Embodiments of the invention is described below with reference to the attached figures which show embodiments of the invention by way of example. Schematically, in the drawings.

DETAILED DESCRIPTION OF THE INVENTION

First of all, it is noted that identical and similar parts in the figures are denoted by the same reference signs, and—unless otherwise stated—functionally similar elements and features are denoted by the same reference signs, in some cases with different indices.

It is furthermore noted that position indications such as "top," "bottom," "to the side," "horizontal" and "vertical" and the like refer to the illustrated spatial position of the pressure reducer. When there is a change in the spatial position of the pressure reducer, the position indications will require an appropriate mental adjustment.

Figure 1:
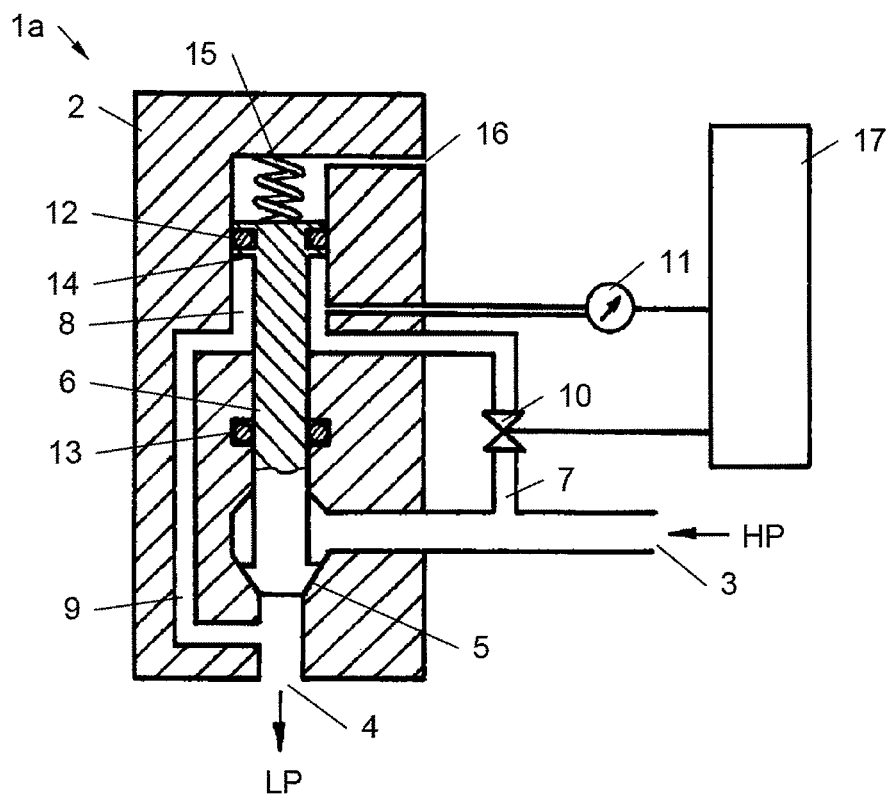
FIG. 1 illustrates in accordance with an embodiment of the invention a pressure reducer having a first control valve.

As illustrated in FIG. 1, a pressure reducer 1a having a housing 2 having a high-pressure (HP) inlet 3, a low-pressure (LP) outlet 4, a valve seat 5 arranged in the housing 2, and a valve plunger 6 mounted displaceably in the housing 2. The valve seat 5 and the valve plunger 6 form a valve, which is arranged along a first path between the high-pressure inlet 3 and the low-pressure outlet 4. The pressure reducer 1a further has a second path, which connects the high-pressure inlet 3 and the low-pressure outlet 4. More specifically, a first connecting line 7 leads from the high-pressure inlet 3 to a first rear plunger chamber 8, and a second connecting line 9 leads from the first rear plunger chamber 8 to the low-pressure outlet 4. Moreover, a first control valve 10 is arranged in the course of the first connecting line 7, and a first pressure gauge 11 is connected to or otherwise in communication with the first rear plunger chamber 8.

As further illustrated in FIG. 1, the valve plunger 6 has, in addition to the forward area which faces the valve seat 5, a rear area, on which a first seal 12 is provided. Also arranged in the housing 2 is a second seal 13, which seals off the high-pressure inlet 3 from the first rear plunger chamber 8. The rear area of the valve plunger 6 furthermore includes a first effective area 14, which faces the first rear plunger chamber 8, and a bias or dampening mechanism such as a spring 15, which is arranged spatially above the valve plunger 6. A vent opening 16 is furthermore provided in the housing 2 for pressure compensation. The pressure reducer 1a also includes an electronic open-loop/closed-loop controller 17, which is operatively connected to the first control valve 10 and the first pressure gauge 11.

The operation of the arrangement illustrated in FIG. 1 will now be explained with reference to FIG. 2, which indicates the characteristic of the pressure p along the second path "s." In a first state, it is assumed that the first control valve 10 is closed. The pressure characteristic illustrated by a solid line is thus obtained in FIG. 2. It can be seen from this that the pressure difference between the high pressure HP and the low pressure LP falls away completely at the first control valve 10. The pressure $p_{11}$ at the first pressure gauge 11 is therefore equal to the low pressure LP. Since this pressure $p_{11}$ corresponds to the pressure in the first rear plunger chamber 8, it also acts on the first effective area 14 and causes a first force, which acts on the valve plunger 6 in the direction of displacement thereof and is directed away from the valve seat 5. However, the spring force caused by the spring 15 and the force caused by the high pressure HP on the lower end of the valve plunger 6 are greater and, as a result, the plunger is pressed against the valve seat 5, and the high-pressure inlet 3 thus remains separated from the low-pressure outlet 4.

Figure 2:
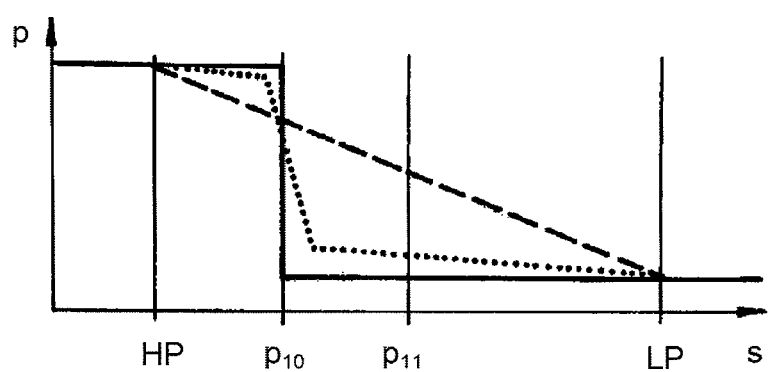
FIG. 2 illustrates a pressure characteristic along the second path in the pressure reducer of FIG. 1.

In a second state, the first control valve 10 is opened somewhat, giving the pressure characteristic illustrated by a dotted line in FIG. 2. In FIG. 2, it can now be seen that the pressure difference between the high pressure HP and the low pressure LP no longer falls away completely at the first control valve 10, but does so only partially (see the steeply sloping section of the pressure characteristic). The remainder falls away along the first connecting line 7, the first rear plunger chamber 8 and the second connecting line 9, through which there is now a slight flow (see the gently sloping sections of the pressure characteristic). The pressure $p_{11}$ at the first pressure gauge 11 is now somewhat higher than the low pressure LP, and therefore the first, upward-directed force on the valve plunger 6 is also greater.

If the first control valve 10 is opened further, the pressure $p_{11}$ and hence the first force on the valve plunger 6 increases to a level such that it exceeds the sum of the spring force caused by the spring 15 and the force caused by the high pressure HP on the lower end of the valve plunger 6, with the result that the plunger is raised from the valve seat 5, and the high-pressure inlet 3 is thus connected to and/or in communication with the low-pressure outlet 4. As a result, the pressure difference between the high pressure HP and the low pressure LP continues to fall until there is once again an equilibrium of forces at the valve plunger 6. Depending on the position of the first control valve 10, a certain pressure loss is thus established between the high-pressure inlet 3 and the low-pressure outlet 4. At this point, it is noted that said reduction in the pressure difference between the high pressure HP and the low pressure LP has not been taken into account in FIG. 2 (or in FIGS. 4, 6 and 8), for the sake of simplicity.

When the first control valve 10 is completely open, the pressure along the second path falls more or less linearly, and a maximum is thus obtained for the pressure $p_{11}$.

In summary, the pressure reducer 1a in accordance with the invention includes a second path which operatively connects the high-pressure inlet 3 and the low-pressure outlet 4, a first controllable control valve 10 arranged in the course of the second path, and a first effective area 14 of the valve plunger 6, which is arranged in the course of the second path and which is aligned in such a way that a first control pressure $p_{11}$ acting thereon results in a first force on the valve plunger 6 in the direction of displacement. The pressure reducer 1a furthermore includes a spring 15 which is provided for the purpose of exerting a spring force acting on the valve plunger 6 in a direction counter to the first force. Moreover, the pressure reducer 1a includes a first measuring device, such as a first pressure gauge 11, which measures the first control pressure $p_{11}$ and an open-loop/closed-loop controller 17 which operatively controls the first control valve 10.

It is advantageous if the first control pressure $p_{11}$ is detected by the open-loop/closed-loop controller 17 and regulated by controlling the first control valve 10. For this purpose, the first control valve 10 can be designed as a proportional valve, for example. However, it is also conceivable for the first control valve 10 to be designed as an on-off valve and to be controlled by way of a puke-width-modulated signal. In both cases, the pressure difference between the high-pressure inlet 3 and the low-pressure outlet 4 can be continuously adjusted by way of a small flow via the second path. Because of the relatively low forces acting on the first control valve 10, a servo or intensification effect is obtained here.

It is advantageous for the first control valve 10 that one hundred percent sealing between the high-pressure inlet 3 and the low-pressure outlet 4 is not absolutely essential if a certain residual flow through the pressure reducer 1a is allowed. The first control valve 10 can thus be designed in such a way that a medium for which the pressure reducer 1a is set up flows through the control valve 10, even in the closed position, when a pressure difference is applied between the high-pressure inlet 3 and the low-pressure outlet 4. This makes it possible to use a first control valve 10 of relatively simple construction.

Figure 3:
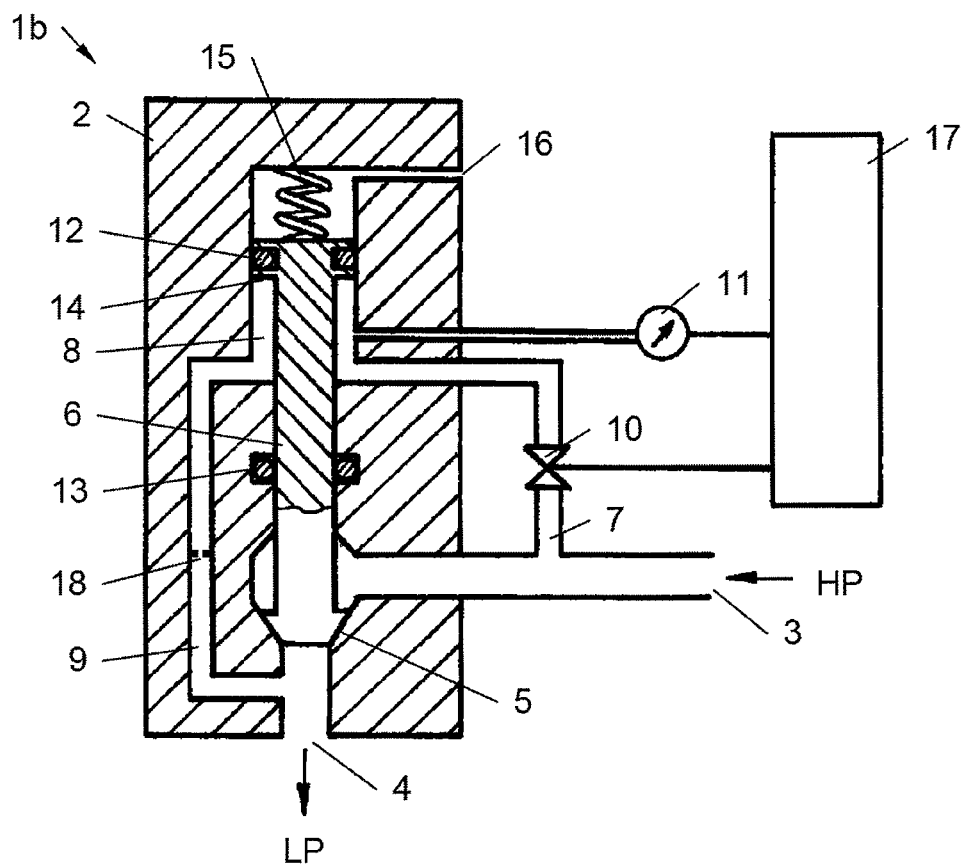
FIG. 3 illustrates in accordance with an embodiment of the invention a pressure reducer having an additional orifice.

As illustrated in FIG. 3, a variant of a pressure reducer 1b in accordance with the invention which is structurally and/or functionally similar to the pressure reducer 1a illustrated in FIG. 1. In contrast, however, a restriction in the form of an orifice 18 is provided in the second connecting line 9. Thus, a restriction 18 is provided in the course of the second path, with the first effective area 14 being arranged between the restriction 18 and the first controllable valve 10.

Figure 4:
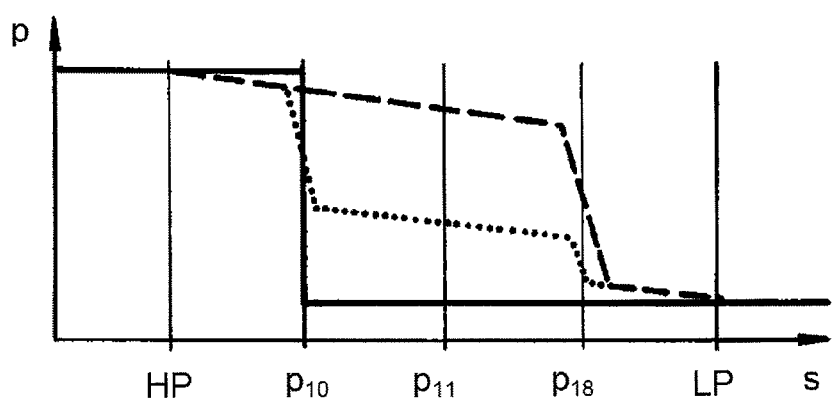
FIG. 4 illustrates a pressure characteristic along the second path in the pressure reducer of FIG. 3.

As illustrated in FIG. 4, the operational effect the restriction 18 has on the pressure characteristic is shown. When the first control valve 10 is closed, there is no difference with respect to the previous variant. However, if the first control valve 10 is opened, there is a relatively sharp pressure loss $p_{18}$ at the orifice 18. It can be seen in FIG. 4 that the maximum achievable first control pressure $p_{11}$ (dashed line) is now significantly higher than in the variant presented in FIGS. 1 and 2. There is thus a larger adjustment range for the first control pressure $p_{11}$, and this may make regulation thereof easier.

Moreover, in principle, it would also be conceivable in the case of the two pressure reducers 1a and 1b for the first rear plunger chamber 8 to be arranged above the valve plunger 6 and accordingly for the first force caused by the first pressure $p_{11}$ to press the valve plunger 6 against the valve seat 5. The spring 15 would then accordingly have to be arranged or designed as a tension spring in such a way that the spring force thereof was directed counter to the first force. When the first control valve 10 was closed, the valve plunger 6 would then rise to the greatest extent from the valve seat 5. However, it should be borne in mind with this embodiment that the first control valve 10 must be opened in order to press the valve plunger 6 against the valve seat 5 and hence ensure that there is always a flow from the high-pressure inlet 3 to the low-pressure outlet 4. In certain applications, this may be an advantage.

One advantage of the abovementioned arrangement (plunger chamber 8 spatially above the valve plunger 6) is provided by the fact that the closing force on the valve plunger 6 rises when there is a rise in pressure at the low-pressure outlet 4, thus providing an automatic regulating function or safety function. In many applications, however, there may also be a requirement for the pressure reducer 1a, 1b to be opened in the event of a rise in pressure at the low-pressure outlet 4. This can be accomplished precisely by the fact that the plunger chamber 8 is arranged below the valve plunger 6. If, for example, an outflow on the low-pressure side is closed quickly (no longer any flow at the pressure reducer 1a, 1b), the pressure rises briefly at the low-pressure outlet 4 and can no longer be relieved. As a result, there is also a rise in the pressure in the plunger chamber 8, and the pressure reducer 1a and 1b is opened.

It would furthermore be conceivable in the case of the pressure reducers 1a, 1b for the first control valve 10 not to be arranged in the first connecting line 7 but in the second connecting line 9. Similarly, any orifice 18 present can be arranged in the first connecting line 7 instead of the second connecting line 9, thus in turn reversing the pressure ratios. For example, a closed first control valve 10 arranged in the second connecting line 9 has the effect that the high pressure HP prevails in the first rear plunger chamber 8 and thus causes the valve plunger 6 to rise from the valve seat 5 in the variants illustrated in FIGS. 1 and 3. Thus, the variants mentioned in this paragraph can advantageously be combined with the variants mentioned in the previous paragraph since then the valve plunger 6 is pressed against the valve seat 5 when the first control valve 10 is closed and the first plunger chamber 8 is at the top, and a flow between the high-pressure inlet 3 and the low-pressure outlet 4 can be avoided.

Figure 5:
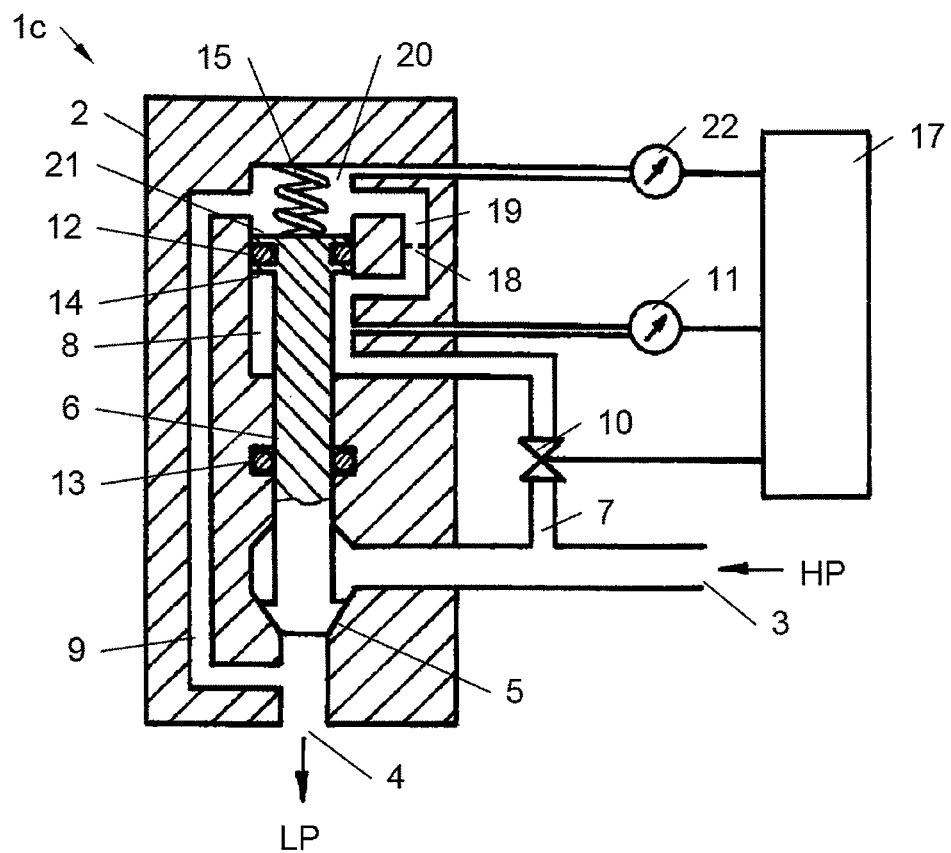
FIG. 5 illustrates in accordance with an embodiment of the invention a pressure reducer having an additional rear plunger chamber.

As illustrated in FIG. 5, a variant of a pressure reducer 1c, in which the second path is spatially arranged somewhat differently to the way in which it is arranged in the variants described hereinabove. Although a first connecting line 7 once again connects the high-pressure inlet 3 and the first rear plunger chamber 8, a third connecting line 19, which includes a restriction in the form of an orifice 18, leads from the first rear plunger chamber 8 to a second rear plunger chamber 20, and the second connecting line 9 leads from the second rear plunger chamber 20 to the low-pressure outlet 4. Towards the second rear plunger chamber 20, the valve plunger 6 has a second effective area 21. The pressure reducer 1c therefore includes a second effective area 21 of the valve plunger 6, which is arranged in the course of the second path and is aligned in such a way that a second control pressure $p_{22}$ acting thereon results in a second force on the valve plunger 6 in the direction of displacement, the second force acting counter to the first force resulting from the first control pressure $p_{11}$. Here, the restriction 18 is arranged in the course of the second path between the first effective area 14 and the second effective area 21. A first control valve 10 is once again arranged in the course of the first connecting line 7. A first pressure gauge 11 is furthermore connected to the first rear plunger chamber 8, and a second pressure gauge 22 is connected to the second rear plunger chamber 20.

Figure 6:
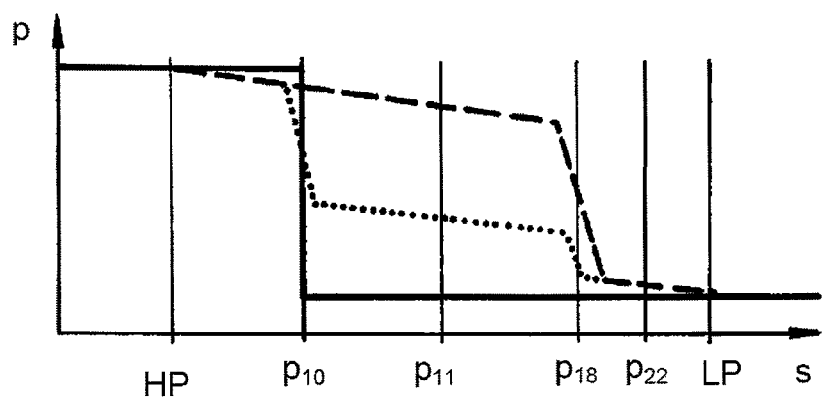
FIG. 6 illustrates a pressure characteristic along the second path in the pressure reducer of FIG. 5.

As illustrated in FIG. 6, shown are the pressure characteristics along the second path "s" with the first control valve 10 closed (solid line), the control valve 10 partially opened (dotted line) and the control valve 10 completely open (dashed line). The pressure characteristic shown in FIG. 6 is very similar to the pressure characteristic shown in FIG. 4, but the second control pressure $p_{22}$, which acts on the second effective area 21 of the valve plunger 6 and causes a downward force, has to be taken into account. A different equilibrium of forces is thus obtained at the valve plunger 6 than is the case with the two variants mentioned above. However, the principle that opening of the first control valve 10 causes the valve plunger 6 to rise from the valve seat 5 remains the same.

It is advantageous in this variant that no leakage to the outside, of the kind which would be possible via the seal 12 in the case of pressure reducers 1a and 1b, can occur at the valve plunger 6. In the case of the pressure reducer 1c, the seal 12 can therefore be of lower quality or can even be omitted entirely.

Figure 7:
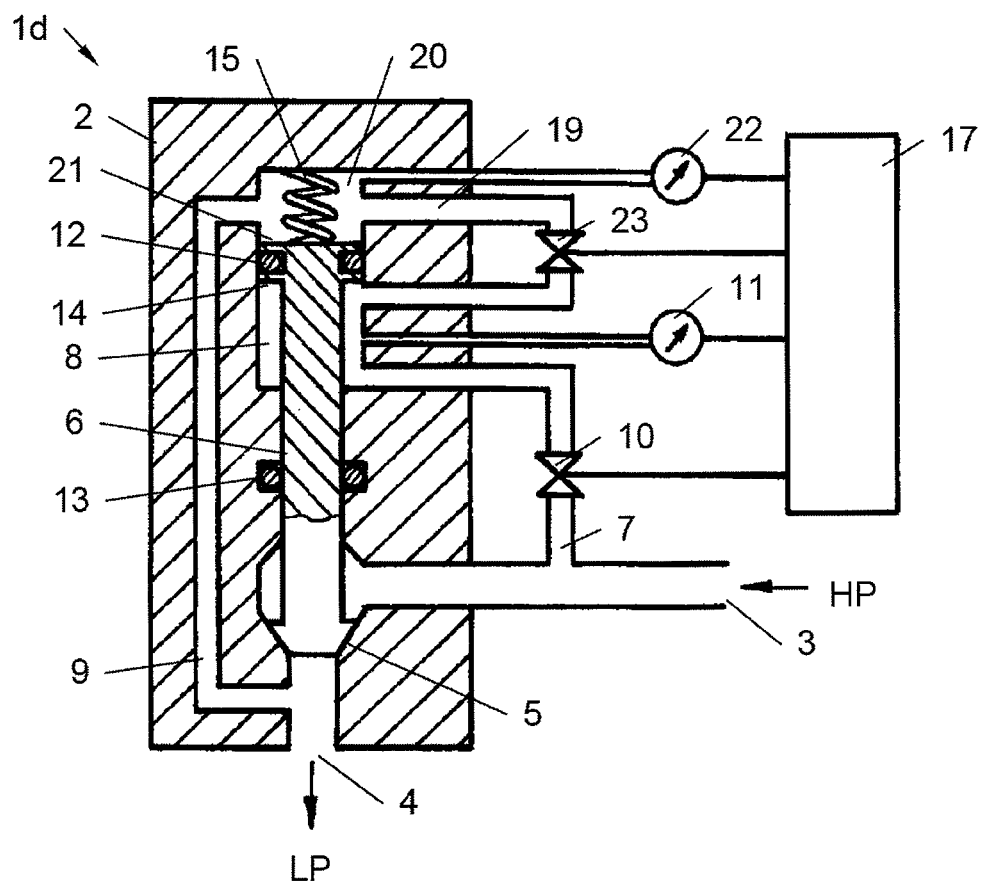
FIG. 7 illustrates in accordance with an embodiment of the invention a pressure reducer having two control valves.

As illustrated in FIG. 7, another variant of a pressure reducer 1d, which is structurally similar to the pressure reducer 1c shown in FIG. 5. In contrast, however, a second control valve 23 is provided in the third connecting line 19 instead of the orifice 18. The pressure reducer 1d thus includes a second controllable valve 23 in the course of the second path, with the effective area 14 being arranged between the first controllable valve 10 and the second controllable valve 23. The second controllable valve 23 is furthermore arranged in the course of the second path between the first effective area 14 and the second effective area 21. Moreover, the second force, which is caused by the second control pressure $p_{22}$ acting on the second effective area 21, and the spring force are directed in the closing direction of the valve plunger 6.

Figure 8:
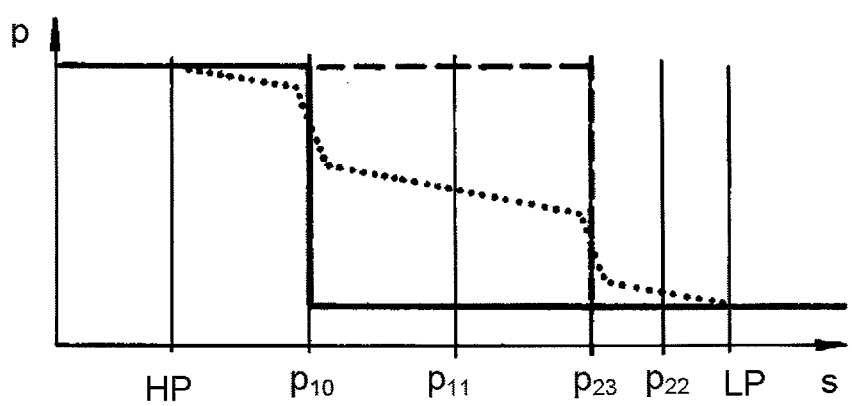
FIG. 8 illustrates a pressure characteristic along the second path in the pressure reducer of FIG. 7.

As illustrated in FIG. 8, provided the pressure characteristics along the second path "s" with the first control valve 10 closed and the second control valve 23 open (solid line), the first control valve 10 partially open and the second control valve 23 partially open (dotted line) and the first control valve 10 completely open and the second control valve 23 completely closed (dashed line). It is seen in FIG. 8 that the maximum achievable first control pressure $p_{11}$ (dashed line) is equal to the high pressure HP and is now once again higher than in the variants presented in FIGS. 3 and 6. An even larger adjustment range for the first control pressure $p_{11}$ is thus obtained, and this may make regulation thereof easier.

In accordance with the embodiment illustrated in FIGS. 7 and 8, the open-loop/closed-loop controller 17 measures the first control pressure $p_{11}$ and the second control pressure $p_{22}$. Moreover, the open-loop/closed-loop controller 17 operatively controls both the first control valve 10 and the second control valve 23 in order in this way to adjust the first control pressure $p_{11}$ and/or the second control pressure $p_{22}$. The first control pressure $p_{11}$ and the second control pressure $p_{22}$ can thus be regulated. Like the first control valve 10, the second control valve 23 can also be designed as a proportional valve or as an on-off valve. If the second control valve 23 is designed as an on-off valve, it can in turn be controlled by way of a pulse-width-modulated signal and thus act as it were as a proportional valve. The second control valve 23 can also be designed in such a way that a medium for which the pressure reducer 1d is set up flows through the valve 23, even in the closed position, when a pressure difference is applied between the high-pressure inlet 3 and the low-pressure outlet 4.

Generally, a first control spool and/or a second control spool can be provided instead of the first control valve 10 and/or the second control valve 23. In general, the first control valve 10 and/or the second control valve 23 and the connecting line 7 can also be arranged in the housing 2. The connecting lines 9, 19 can also be routed to the outside.

In principle, it would once again be conceivable in the case of the two pressure reducers 1c and 1d for the first rear plunger chamber 8 to be arranged spatially above the valve plunger 6 and for the second rear plunger chamber 20 to be arranged spatially below the valve plunger 6, with the result that the first force caused by the first pressure $p_{11}$ accordingly presses the valve plunger 6 against the valve seat 5, and the force caused by the second pressure $p_{22}$ tends to raise the valve plunger 6 from the valve seat 5. Once again, the spring 15 would then accordingly have to be arranged or designed as a tension spring in such a way that the spring force thereof was directed counter to the first force and in the direction of the second force. When the first control valve 10 was closed, the valve plunger 6 would then rise to the greatest extent from the valve seat 5. However, in contradistinction to the equivalent variant of the pressure reducers 1a, 1b, the second control valve 23 means that there is no flow from the high-pressure inlet 3 to the low-pressure outlet 4 even when the valve plunger 6 is pressed onto the valve seat 5.

In accordance with embodiments, the pressure reducer 1d for the first control valve 10 may not be arranged in the first connecting line 7 but in the third connecting line 19, and the second control valve 23 may not to be arranged in the third connecting line 19 but in the second connecting line 9. Similarly, the following variants would be conceivable for pressure reducer 1c, the orifice 18 in the first connecting line 7 and the first control valve 10 in the third connecting line 19, the orifice 18 in the third connecting line 19 and the first control valve 10 in the second connecting line 9, and the orifice 18 in the second connecting line 9 and the first control valve 10 in the third connecting line 19. The variants mentioned in this paragraph can once again advantageously be combined with the variants mentioned in the previous paragraph.

Figure 9:
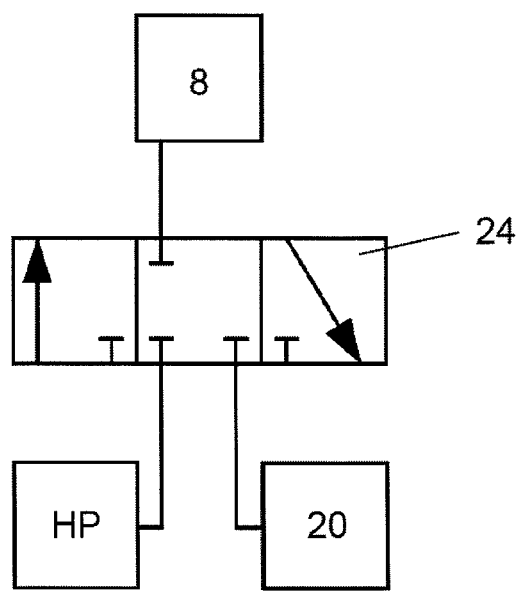
FIG. 9 illustrates a 3/3-way valve forming the first and the second control valve.

As illustrated in FIG. 9, provided is a further advantageous embodiment of the control valves 10, 23, such that they are combined to form a 3/3-way valve 24. In a first position of the 3/3-way valve 24, the first connecting line 7 (from the high-pressure inlet 3 to the plunger chamber 8) is open, whereas the second connecting line 19 (from plunger chamber 8 to plunger chamber 20) is closed. In a second position 2, the connecting line 7 is closed and the second connecting line 19 is open and, in a third position (illustrated in FIG. 9), both connecting lines 7 and 19 are closed. In the first position, a pressure characteristic as indicated by the dashed line is thus obtained in FIG. 8, and a pressure characteristic in accordance with the solid line is obtained in the second position.

Figure 10:
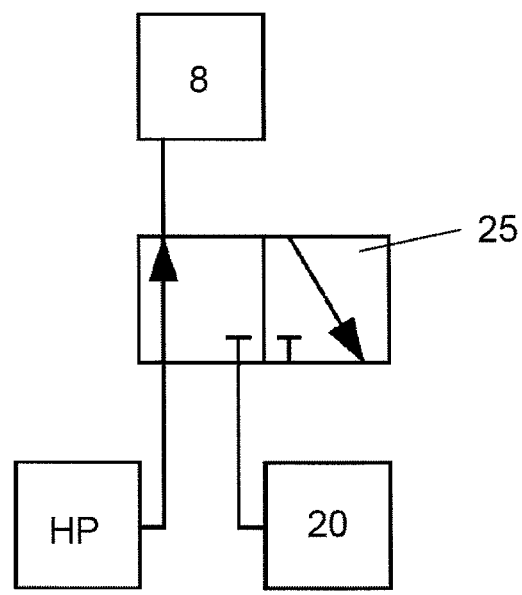
FIG. 10 illustrates a 3/2-way valve forming the first and the second control valve.

As illustrated in FIG. 9, provided is another advantageous variant in the third position, described hereinabove, of the 3/3-way valve 24 can also be omitted, and the two control valves 10 and 23 are thus formed by a 3/2-way valve 25. In a first position of the 3/2-way valve 25 in this embodiment, the first connecting line 7 is open, and the second connecting line 19 is closed (illustrated in FIG. 10), and therefore a pressure characteristic in accordance with the dashed line is once again obtained in FIG. 8. In a second position, by contrast, the first connecting line 7 is closed and the second connecting line 19 is open, and therefore a pressure characteristic in accordance with the solid line is once again obtained in FIG. 8.

If valve 24 or 25 is constructed as a proportional valve, any desired pressure $p_{11}$ can furthermore be set by selecting an intermediate position (see dotted line in FIG. 8). As an alternative, especially if valve 24 or 25 is constructed as an on-off valve, any desired pressure can also be set by pulse-width-modulated control of valve 24 or 25. In both cases, it is advantageous if the first and second positions of the 3/3-way valve 24 are adjacent to one another.

Finally, attention is drawn to the fact that the components shown in the figures are to some extent shown in a simplified form. In reality, a pressure reducer 1a, 1b, 1c and 1d in accordance with embodiments of the invention may also deviate from the illustration and, in particular, can include more complex and/or additional components that are not illustrated here. Finally, it is pointed out that the illustrations are not necessarily to scale and that the proportions of actual components may also differ from the proportions of the components illustrated.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for operating a pressure reducer, the method comprising:
    providing a pressure reducer having a high-pressure inlet, a low-pressure outlet, a valve having a valve seat and a valve plunger which interacts therewith, the valve plunger configured for displacement in a displacement direction such that, when displaced away from the valve seat, the valve plunger opens a first path between the high-pressure inlet and the low-pressure outlet, and a second path operatively connecting the high-pressure inlet and the low-pressure outlet;
    adjusting, via a first control valve, a first control pressure acting on a first effective area of the valve plunger and resulting in a first force acting on the first effective area in the displacement direction away from the valve seat, wherein the first effective area and the first control valve are arranged in the second path; and
    adjusting, via a second control valve, a second control pressure on a second effective area of the valve plunger which is spatially arranged in the second path, thereby resulting in a second force acting on the second effective area in a second displacement direction towards the valve seat, the second force acting counter to the first force.

2. The method of claim 1, wherein:
    the first control pressure is adjusted using the first control valve, the first control valve being provided in the second path; and
    the first control valve is controlled using a pulse-width-modulated signal.

3. The method of claim 2, wherein:
    the second control valve is provided in the second path; and
    the second control valve is controlled using a pulse-width-modulated signal.

4. A pressure reducer comprising:
    a housing having a high-pressure inlet and a low-pressure outlet;
    a valve arranged in the housing, the valve having a valve seat and a valve plunger which interacts with the valve seat, the valve plunger configured for displacement in a displacement direction such that, when displaced away from the valve seat, the valve plunger opens a first path between the high-pressure inlet and the low-pressure outlet;
    a second path which operatively connects the high-pressure inlet and the low-pressure outlet;
    a first control valve which is arranged in the second path; and
    a second control valve which is arranged in the second path,
    wherein a rear area of the valve plunger has a first effective area which is spatially arranged in the second path between the first control valve and the second control valve and is spatially aligned such that a first control pressure acting thereon results in a first force on the valve plunger in the displacement direction, and a second effective area of the valve plunger which is spatially arranged in the second path and spatially aligned such that a second control pressure acting thereon results in a second force on the valve plunger in a second displacement direction towards the valve seat, the second force acting counter to the first force.

5. The pressure reducer of claim 4, further comprising a restriction provided in the second path, wherein the first effective area is arranged spatially between the restriction and the first control valve.

6. The pressure reducer of claim 4, wherein the second control valve is arranged in the course of the second path between the first effective area and the second effective area, and in that the second force and a spring force are directed in a closing direction of the valve plunger.

7. The pressure reducer of claim 4, further comprising an open-loop controller which controls at least one of the first control valve and the second control valve.

8. The pressure reducer of claim 4, further comprising a closed-loop controller which detects at least one of the first control pressure and the second control pressure and also controls at least one of the first control valve and the second control valve.

9. The pressure reducer of claim 4, wherein at least one of the first control valve and the second control valve comprises a proportional valve.

10. The pressure reducer of claim 4, wherein at least one of the first control valve and the second control valve comprises an on-off valve.

11. The pressure reducer of claim 4, wherein at least one of the first control valve and the second control valve is configured such that when a pressure difference is applied between the high-pressure inlet and the low-pressure outlet, a medium flowing through the pressure reducer flows through at least one of the first control valve and the second control valve even in a closed position of the at least one of the first control valve and the second control valve.

12. The pressure reducer of claim 4, wherein the first control valve and the second control valve comprises a 3/3-way valve or a 3/2-way valve.

13. The pressure reducer of claim 4, wherein the first control valve and the second control valve comprises a 3/2-way valve.

14. The pressure reducer of claim 4, wherein one of the first control valve, the second control valve and the restriction is arranged spatially in the second path between the first effective area and the second effective area.

15. The pressure reducer of claim 4, further comprising:
    a first measuring device which measures the first control pressure; and
    a second measuring device which measures the second control pressure.

16. The pressure reducer of claim 4, further comprising a bias mechanism which exerts a force on the valve plunger in a direction of one of the first force and the second force.

17. A pressure reducer comprising:
a valve arranged in a housing having a high-pressure inlet and a low-pressure outlet, the valve having a valve seat and a valve plunger valve plunger to be displaced in a displacement direction from the valve seat which opens a first path between the high-pressure inlet and the low-pressure outlet;
a second path to operatively connect the high-pressure inlet and the low-pressure outlet, the second path having a first connecting line which extends from the high-pressure inlet to a first rear plunger chamber, a second connecting line which extends from a second rear plunger chamber to the low-pressure outlet, and a third connecting line which extends from the first rear plunger chamber to the second rear plunger chamber;
a first control valve arranged in the first connecting line;
a second control valve provided in the third connecting line,
wherein the valve plunger has:
  a first effective area at a rear area thereof which faces the first rear plunger chamber such that a first control pressure acting thereon is to result in a first force on the valve plunger in the displacement direction away from the valve seat, and
  a second effective area at a rear area thereof which faces the second rear plunger chamber such that a second control pressure acting thereon is to result in a second force on the valve plunger that is to act counter to the first force.

18. The pressure reducer of claim 17, further comprising a controller to detect the first control pressure and the second control pressure and also control the first control valve and the second control valve based upon one of the detected first control pressure and the second control pressure.

* * * * *